July 11, 1944. G. J. HENRY 2,353,306
RELIEF VALVE
Filed Feb. 7, 1939
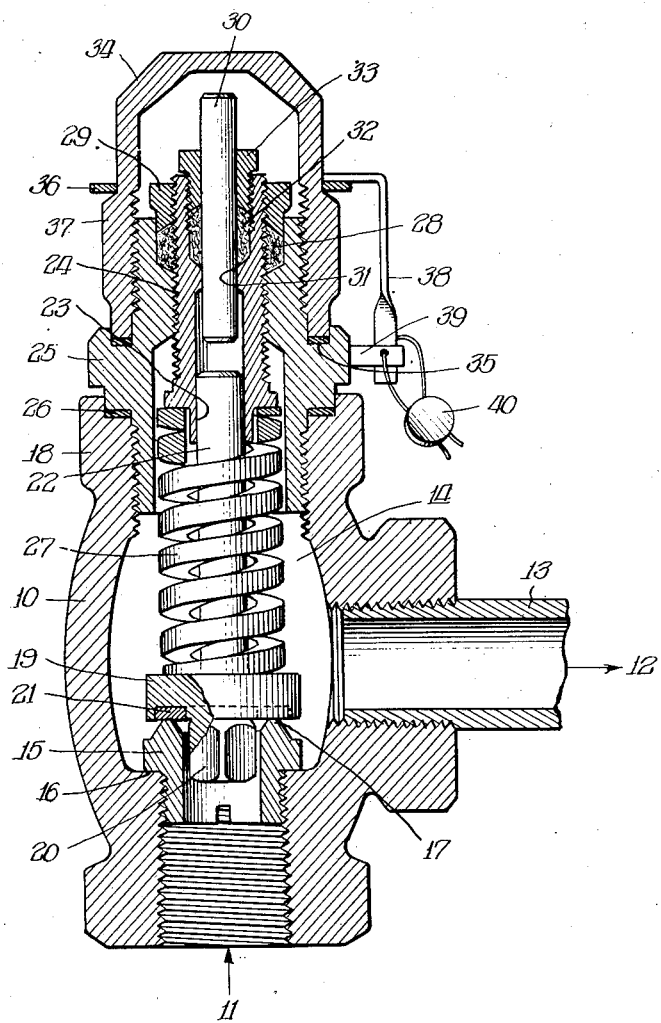
Inventor:
Guy J. Henry,
By Cromwell, Greist & Warden
Attys Patented July 11, 1944

2,353,306

UNITED STATES PATENT OFFICE 2,353,306

RELIEF VALVE

Guy J. Henry, Chicago, Ill.

Application February 7, 1939, Serial No. 255,132

1 Claim. (Cl. 137—53)

The present invention relates to an improved relief valve for use in fluid pressure systems.

The principal object of the invention is to provide an improved pressure relief valve which is equipped with means for effectively re-seating the valve after the same has become unseated.

Another object of the invention is to provide an improved relief valve of the character described which is particularly well suited for use in installations where the valve is called upon to unseat repeatedly, the improved re-seating means acting in such a way as to prevent leakage and eliminate unreliable results due to deposits left on the valve parts during flow through the same.

A further object is to provide an improved relief valve of the character described which is spring loaded, and is equipped with a readily accessible re-seating rod.

These and other objects will be evident upon a consideration of the following description of the preferred embodiment of the invention and by reference to the accompanying drawing, in which the single figure is a longitudinal sectional view through a relief valve constructed in accordance with the invention.

The device shown in the drawing includes a hollow body portion 10 which is provided with an inlet port 11 at its lower end and an outlet port 12 in one of its sides in connection with an outlet conduit 13. The body portion 10 is elongated in shape and is provided within its chambered interior 14 with an annular valve seat 15. The valve seat 15 is threaded into the inlet port 11 at the discharge end of the latter and is provided with a centrally arranged orifice which forms a passageway for fluid entering through the inlet port 11. An annular shoulder 16 on the under side of the valve seat 15 engages with the edge of the wall of the body portion 10 and forms a fluid-tight seal with the same.

The valve seat 15 is characterized by an annular upwardly extending rim portion 17 which tapers upwardly in radial section and is of relatively narrow width at its upper edge. It is desirable that the valve seat, and particularly the rim portion 17, be composed of relatively hard metal which is fully resistant to the fluids with which the relief valve is intended to be used. Stainless steel is suitable for this purpose, as it is quite hard and will provide a smooth rim portion for accurate fit.

The body portion 10 is provided at its upper end with a relatively large internally threaded flange 18, through which the valve seat 15 and certain other hereinafter described parts may be inserted. The valve seat 15 is designed for co-action with a valve disk 19. This valve disk is centered on the narrow edged rim 17 of the valve seat by a projection 20 on the bottom of the valve disk, which projection is provided with side bearing portions adjacent the wall of the orifice in the valve seat and intermediate cut away portions for allowing escape of fluid. The valve disk 19 is provided in its under surface with an annular insert 21, which insert is so positioned as to engage with the rim portion 17 of the valve seat 15. The insert 21 is preferably composed of some relatively soft metal. A lead alloy possessing as high a melting point as possible, with a small differential between its melting and solidification points, and with a relatively high degree of hardness for lead is well suited for this purpose. One desirable alloy used in this connection has a melting point of 551° F. and complete solidification at 525° F., a differential of only 26°. These temperatures are far above any temperatures encountered even under extreme conditions of operation in ordinary refrigeration systems. While the insert 21 is relatively soft with respect to the rim 17, it is sufficiently hard to resist any appreciable penetration by the rim.

The valve disk 19 is provided at the center of the top of the same with an upwardly projecting stem 22, which stem is slidably mounted at its upper end in a bore 23 in an exteriorly screw-threaded adjusting screw 24. The adjusting screw 24 is screwed into a bonnet 25 which is in turn screwed into the flange 18 at the top of the body portion on an interposed sealing gasket 26. The valve disk 19 is normally held in fluid-tight engagement with the valve seat 15 by a helical spring 27 which loosely surrounds the stem 22 and is pressed between the top of the valve disk 19 and the bottom of the adjusting screw 24. The pressure exerted by the spring 27 on the valve disk 19 and consequently the points of release of the relief valve, is determined by the position of the adjusting screw 24 in the bonnet 25. The adjusting screw 24 is sealed with respect to the bonnet 25 by means of a packing 28 about the upper end of the adjusting screw, which packing is compressed within a gland in the top of the bonnet by a locking nut 29 on the screw.

A push rod 30 is slidably mounted in a bore 31 in the upper portion of the adjusting screw 24, with its lower end directly above and normally in vertically spaced relation to the upper end of the stem 22 of the valve disk. The rod 30 is sealed in the upper end of the adjusting screw 24 by another packing 32 which is compressed in a gland in the screw by a nut 33.

The upper end of the push rod 30 is covered over by a cap 34 which is screwed onto the outer portion of the bonnet 25. This cap is of sufficient height to allow for the upward movement of the push rod 30 whenever the relief valve discharges. When the cap 34 is screwed down into place its lower edge preferably seats against a gasket 35, which gasket provides a fluid-tight seal for the cap. A small sheet metal ring 36 is preferably placed about the upper portion of the cap 34 immediately above an enlarged polygonal portion 37 on the cap, and a sealing pin 38 extends downwardly from this ring to another sealing pin 39 secured to the bonnet 25. These two pins are fastened together by a tamper-proof seal which prevents removal of the cap 34 without evidence of the fact that it has been removed and insures against any unauthorized change in the pressure adjustment of the relief mechanism.

This improved relief valve is of particular utility in high pressure gas systems, such as high pressure ammonia refrigeration systems. The valve may be adjusted to function at predetermined pressures within close limits and its construction is such as to insure repeated operation at exactly the pressure for which set. The conduit from the outlet port may conduct the discharge gas to atmosphere or to any suitable source of disposal. When the pressure in the system becomes excessive the valve disk 19 is separated slightly from the seat 15 and allows an initial relatively slight escape of gas. As the pressure continues to build up the valve opens wider and wider until full relief is effected. The difference in the pressure necessary between the first relief and the full opening of the valve may be of the order of 30 pounds per square inch. For example, if the valve is set to provide first relief at 270 pounds per square inch pressure it will be fully opened at about 300 pounds per square inch pressure.

It is important that the valve retain its operativeness after its initial blow-off, and it is further important that the predetermined pressure for which the valve initially was set be effective in its repeated operation. As is known, the escape of gas through the inlet port of a relief valve is often accompanied by a deposit of scale or other solids between the valve seat and the valve disk. When the pressure in the system recedes the spring causes the valve disk to be reseated on the valve seat, and when this happens in the ordinary relief valve any solids which may have been deposited on the valve seat or valve disk may prevent accurate seating of the disk. A great deal of trouble has been caused by inability to properly reseat valve disks subsequent to operation of relief valves, but the improved construction of the present relief valve provides for the ready and accurate reseating of the disk without need for any change in the adjustment of the mechanism. After operation of the relief valve the seal 40 is broken and the cap 34 removed. By tapping the upper end of the reseating push rod 30 the disk 19 is caused to reseat itself perfectly upon the narrow rim 17 of the valve seat 15 even though there has been some deposit of scale or the like within the valve. The tapered ridge 17 is of glass-like smoothness and a few taps with a hammer on the packed reseating rod 30 will be sufficient to bring this ridge into smooth and uniform engagement with the relatively soft insert 21 in the valve disk. Because of the narrow raised character of the ridge 17 on the valve seat, particles of scale which might otherwise tend to lodge on the seat will fall away clear of the top of such ridge.

By making the reseating rod 30 separate from the stem 22 of the valve, the lower end of the rod 30 can be withdrawn from the upper end of the stem 22 after the valve has been accurately reseated, whereby to leave an unobstructed path for the free upward movement of the valve and stem when the pressure of the fluid exceeds the amount for which the spring 27 is set, thereby allowing for a more accurate setting of the valve than would be possible were the stem of the valve extended upwardly through the adjusting screw 24 and packed against leakage therein.

It will be appreciated that this relief valve may be used in many different types of pressure fluid systems. It is of particular utility in high pressure ammonia refrigeration systems but it can be used equally well with other refrigerants such as methyl chloride, sulphur dioxide and freon. The gaskets and packing employed will of course be selected in accordance with the gas with which the device is to be used. The valve is of utility in fluid pressure systems other than refrigeration units, and in all cases it will effectively operate to limit the fluid pressure, and may be operated repeatedly without diminishing its efficiency as a safety control device. The structure described herein for purposes of explanation may be changed considerably without departing from the invention and all such changes are intended to be included in the appended claim.

I claim:

A pressure relief valve, comprising a hollow body portion provided with inlet and outlet ports, a relatively hard upstanding annular valve seat at the discharge end of said inlet port, a valve member having a relatively soft deformable insert releasably engaging said seat, means within the inlet port for centering said valve member on said seat, a spring normally pressing said valve member against said seat, a tubular bonnet having a portion which is screwed into the body and a smooth elongated bore within the threaded portion, the threaded portion of the bonnet being larger in diameter than the valve member, and the elongated bore in the bonnet being smaller in diameter than the valve member but larger than the spring, said spring extending a substantial distance into the bore of the bonnet, a tubular adjusting screw which is smaller than the bore and is threaded into the bonnet at the far end thereof, with the end of said screw in engagement with the spring, a stem on the valve member slidably mounted in the bore of the adjusting screw, a re-seating rod slidably mounted in the adjusting screw outwardly of the stem, normally in axially spaced relation to the latter, means for packing the re-seating rod in the adjusting screw, and separate means for packing the adjusting screw in the bonnet.

GUY J. HENRY.